United States Patent [19]

van Gulick

[11] 4,039,514

[45] Aug. 2, 1977

[54] POLYURETHANES CURED WITH DERIVATIVES OF 2,4-DIAMINO-BENZAMIDE

[75] Inventor: Norman Martin van Gulick, Wilmington, Del.

[73] Assignee: E. I. Du Pont de Nemours and Company, Wilmington, Del.

[21] Appl. No.: 598,128

[22] Filed: July 22, 1975

Related U.S. Application Data

[62] Division of Ser. No. 289,460, Sept. 15, 1972.

[51] Int. Cl.² .................... C08G 18/32; C08G 18/72
[52] U.S. Cl. ................. 260/75 NH; 260/77.5 AM; 260/75 NT; 260/77.5 AT
[58] Field of Search ............... 260/75 NH, 77.5 AM

[56] References Cited

U.S. PATENT DOCUMENTS

| 3,794,621 | 2/1974 | Meckel et al. | 260/77.5 AM |
| 3,839,292 | 10/1974 | Erinidis | 260/77.5 AM |

*Primary Examiner*—H.S. Cockeram

[57] ABSTRACT

Polyurethane/polyurea compositions comprising the reaction product of an organic diisocyanate, a glycol having a molecular weight of 500–5000 and a derivative of 2,4-diaminobenzoic acid selected from $C_1$-$C_8$ alkyl and substituted alkyl esters, the amide, alkyl substituted amides, the anilide, substituted anilides, the nitrile and mixtures thereof.

6 Claims, No Drawings

POLYURETHANES CURED WITH DERIVATIVES OF 2,4-DIAMINO-BENZAMIDE

This is a division of application Ser. No. 289,460, filed Sept. 15, 1972.

BACKGROUND OF THE INVENTION

A wide variety of polyurethanes are known in the art. Characteristics of individual polyurethanes are dictated by the various needs for them. It is known that polyurethanes which re cured with glycols do not have great tear strength. This would limit their use for soft foams, low speed tires, typewriter roll covers and printing plates. Certain members of the diamine series have been utilized as curing agents; the resulting vulcanizates have good tear strength but tend to be hard. Consequently, it has been difficult to produce a cured polyurethane which has superior tear strength but at the same time is soft.

SUMMARY OF THE INVENTION

According to this invention it has unexpectedly been discovered that polyurethanes cured with 2,4-diaminobenzoic acid derivatives combine high tear strength with the requisite softness needed for uses such as those indicated above.

The cured polyurethane with these properties is produced by initially reacting an organic diisocyanate with a glycol having a molecular weight of about 500–5000 to form a prepolymer, then curing or chain extending the resulting prepolymer with a derivative of 2,4-diaminobenzoic acid selected from $C_1$-$C_8$ alkyl and substituted alkyl esters, the amide, alkyl substituted amides, the anilinde, substituted anilides, the nitrile, and mixtures thereof. The organic diisocyanate and glycol are reacted at a temperature of about 50° to 110° C for a period of about 0.5 to 10 hours thereby forming a prepolymer. The resulting prepolymer is a diisocyanate-capped diol.

The prepolymer is then cured with a derivative of 2,4-diaminobenzoic acid, the appropriate derivative will be subsequently specified. The curing takes place at a temperature of 20° to 150° C for a period of several minutes to several days. The curing is carried out in a closed cavity, with or without pressure, by standard techniques; it is, of course, important to exclude atmospheric moisture.

In more detail the instant invention pertains to a method for producing improved polyurethane/polyurea compositions. Initially, an organic diisocyanate is reacted with a glycol to form a prepolymer. The organic diisocyanate may be aromatic, aliphatic and/or cycloaliphatic with aromatic diisocyanate being preferred. Broadly, $C_8$-$C_{25}$ aromatic, $C_2$-$C_{18}$ aliphatic and $C_5$-$C_{25}$ cycloliphatic diisocyanates may be utilized. Arylene diisocyanates, i.e., those in which each of the two isocyanate groups is attached directly to an aromatic ring, are preferred. Examples of useful diisocyanates include tolylene-2,4-diisocyanate, 4-methoxy-1,3-phenylenediisocyanate, 4-isopropyl-1,3-phenylenediisocyanate, 4-chloro-1,3-phenylenediisocyanate, 4-butoxy-1,3-phenylenediisocyanate, 2,4-diisocyanatodiphenylether, mesitylene diisocyanate, durylene diisocyanate, 4,4'-methylene-bis(phenylisocyanate), 1,5-naphthalene diisocyanate, p,p'-biphenyl diisocyanate, o-nitro-p,p'-biphenyl diisocyanate, 4,4'-diisocyanatodibenzyl, 1,4-tetramethylene diisocyanate, 1,6-hexamethylene diisocyanate, 1,10-decamethylene diisocyanate, 1,4-cyclohexylene diisocyanate, xylene diisocyanate, 4,4'-methylene-bis(cyclohexyl isocyanate), 1,5-tetrahydronaphthalene diisocyanate and m or p-phenylenediisocyanate. Tolylene diisocyanate, both 2,4- and mixtures of the 2,4- and 2,6-isomers, is preferred.

The diisocyanate as mentioned previously, is reacted with glycol to from the prepolymer; the glycols have a molecular weight of about 500–5000. Several different types of glycols may be utilized, for instance, those derived from saturated and unsaturated polyhydrocarbons, polychloroprene, polyformals, polyalkylene ethers, polyesters, etc. Preferred are polyalkylene ether glycols or polyester glycols. The preferred polyalkylene ether glycols have the general formula $HO(RO)_nH$ wherein R is an alkylene radical of about $C_2$-$C_{10}$ which need not necessarily be the same in each instance. Representative glycols include polyethylene ether glycol, polypropylene ether glycol, polytrimethylene ether glycol, polytetramethylene ether glycol, polypentamethylene ether glycol, polydecamethylene ether glycol, and poly-1,2-dimethylethylene ether glycol. Mixtures of two or more polyalkylene ether glycols may be employed if desired.

The following poyester glycols may be utilized: Polyester glycols prepared by the polymerization of cyclic lactones such as ε-caprolactone capped with diols or by the condensation polymerization of a dicarboxylic acid or its condensation equivalent and a molar excess of an organic polyol, representative diacids being succinic, glutaric and adipic acids and representative organic polyols being ethylene glycol, propylene glycol, 1,3-butanediol, 1,4-butanediol, 1,6-hexanediol, neopentyl glycol, and mixtures thereof. Adipates of lower alkyl polyols are preferred.

The isocyanate and the glycol are reacted at a temperature of about 50° to 110° C, preferably about 70° to 90° C. The reaction takes place over a period of about 0.5 to 10 hours, preferably about 1 to 5 hours. The mole ratio of isocyanate to glycol is about 1–2.5 NCO/OH, preferably about 1.5–2.2.

The resulting prepolymer is then cured with a derivative of 2,4-diaminobenzoic acid. The derivatives which may be utilized are selected from $C_1$-$C_8$ alkyl and substituted alkyl esters, the amide, alkyl substitued amides, the anilide, substituted anilides, the nitrile, and mixtures thereof. More specifically, the 2,4-diamino compound may be defined as having the general formula:

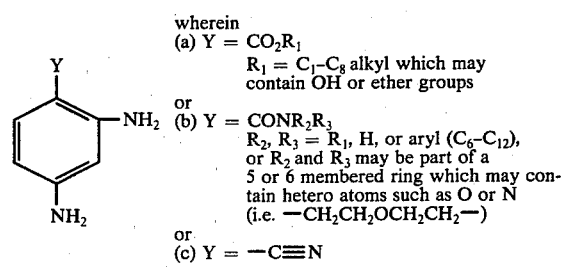

wherein
(a) $Y = CO_2R_1$
$R_1 = C_1$-$C_8$ alkyl which may contain OH or ether groups
or
(b) $Y = CONR_2R_3$
$R_2, R_3 = R_1$, H, or aryl ($C_6$-$C_{12}$), or $R_2$ and $R_3$ may be part of a 5 or 6 membered ring which may contain hetero atoms such as O or N (i.e. $-CH_2CH_2OCH_2CH_2-$)
or
(c) $Y = -C\equiv N$ The preferred derivatives of 2,4-diaminobenzoic acid which may be utilized depend on the hardness desired in the finished product. For a soft product formula (a) wherein $R_1 = C_1$-$C_4$ alkyl is most preferred. For a medium product formula (b) wherein $R_2 = H$ or $R_3$ and $R_3 = C_1$ to $C_4$ alkyl and for a hard product formula (b) wherein $R_2 = H$ and $R_3 = C_6$-$C_{12}$ aryl.

The diamine chain extender and the prepolymer are reacted at a temperature of about 20 to 150° C, preferably about 80 to 120° C. The reaction takes place over a period of about several minutes to several days, preferably about 4 to 20 hours. At the end of this time a vulcanized polyurethane product is recovered. Vulcanizate physical properties depend on the curing agent used. The mole ratio of diamine curing agent or chain extender to prepolymer during the reaction is usually between 0.8 and 1.2, preferably about 0.9 to 1.0.

The resulting cured products have many varied applications. They include the following: soft foams, low speed tires, typewriter roll covers and printing plates.

The following examples will better illustrate the nature of the present invention; however, the invention is not intended to be limited to these examples. All parts, proportions and percentages disclosed herein are by weight unless otherwise indicated.

EXAMPLES

Esters, amides, and anilides of 2,4-diaminobenzoic acid can be prepared by reduction of the corresponding 2,4-dinitrobenzoic acid derivatives. For example, 250 g. of methyl 2,4-dinitrobenzoate in 540 ml of methanol with 1.5 g. of 5% Pd on charcoal was hydrogenated by gradually increasing the hydrogen pressure from 100 to 500 psig and cooling to keep the temperature below 50° C. Hydrogen uptake ceased in 3.5 hr. The mixture was warmed to bring all product into solution, filtered, then distilled until the pot temperature reached 90°. After adding 400 ml. of toluene, distillation was continued until all methanol azeotrope was removed. The mixture was cooled; product was collected, washed with toluene, and dried. Recrystallization from boiling water (25 ml/g) removed a small amount of water-insoluble 4,4'-azobis(methyl anthranilate). A final recrystallization from benzene (3 ml/g) to assure dryness gave 156 g.(85%) of methyl 2,4-diaminobenzoate, creamy-white needles, mp 113–114°,; Found: C 57.7% H 6.1, N 16.7. $C_8H_{10}N_2O_2$ requires C $_{57.8}$, H 6.1, N 16.9).

Table I lists some of the other derivatives of 2,4-diaminobenzoic acid that were prepared by analogous procedures.

mole of poly(tetramethylene ether)diol of molecular weight 980. The reaction took place in a glass kettle with a glass sirrrer, protected from atmospheric moisture. The heat source was an oil bath. This equipment was also used for the other examples.

A mixture of 50 g. of the above polyether-urethane prepolymer and 3.8 g. of crystalline methyl 2,4-diaminobenzoate was stirred at 100° C. for about 8 min. with degassing, poured into a slab mold, then cured for 18 hr. at 100° C.

Properties of the resulting elastomeric copolymer were as follows:

| | |
|---|---|
| $M_{100}$ (psi)* | 250 |
| $M_{300}$ (psi)* | 450 |
| $T_B$ (psi)* | 4700 |
| $E_B$ (%)* | 530 |
| Shore A hardness** | 61 |
| Fast-tear strength (pli)*** | 35 |

*ASTM method D-412
**ASTM method D-676
***ASTM method D-470 with crosshead speed 50 in/min. (Tests used in all examples)

EXAMPLE 2

An isocyanate-capped polyether-urethane prepolymer (6.35% NCO) was prepared by reacting, for 3 hr. at 100° C., 2.00 moles of 2,4-tolylene diisocyanate and 1.00 mole of poly(tetramethylene ether)diol of molecular weight 980.

A mixture of 50 g. of the above polyether-urethane prepolymer and 5.6 g. of crystalline methyl 2,4-diaminobenzoate was stirred at 100° C. for about 6 min. with degassing, poured into a slab mold, then cured for 6.4 hr. at 100° C.

Properties of the resulting elastomeric copolymer were as follows:

| | |
|---|---|
| $M_{100}$ (psi) | 450 |
| $M_{300}$ (psi) | 2500 |
| $T_B$ (psi) | 7800 |
| $E_B$ (%) | 360 |
| Shore A hardness | 72 |
| Fast-tear strength (pli) | 80 |

DERIVATIVES OF 2,4-DIAMINOBENZOIC ACID:

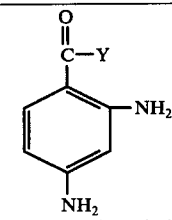

| | | | Elemental Analysis | | | |
|---|---|---|---|---|---|---|
| Y | Melting Point, ° C | Formula | | %C | %H | %N |
| —O(CH$_2$)$_3$CH$_3$ | 110–111 | $C_{11}H_{16}N_2O_2$ | theory | 63.4 | 7.7 | 13.5 |
| | | | found | 63.3 | 7.6 | 13.2 |
| —O(CH$_2$)$_4$OH | '63–64 | $C_{11}H_{16}N_2O_3$ | th. | 58.9 | 7.2 | 12.5 |
| | | | fd. | 58.7 | 7.0 | — |
| —NH(CH$_2$CH$_3$) | 132–133 | $C_9H_{13}N_3O$ | th. | 60.3 | 7.3 | 23.4 |
| | | | fd. | 60.4 | 7.5 | 23.2 |
| —N(CH$_2$CH$_2$)$_2$O | 115–116 | $C_{11}H_{15}N_3O_2$ | th. | 59.7 | 6.8 | 19.0 |
| | | | fd. | 59.7 | 6.9 | 19.0 |
| —NH(Mixed tolyl) | glass | $C_{14}H_{15}N_3O$ | th. | 69.7 | 6.3 | 17.4 |
| | | | fd. | 69.5 | 6.3 | 16.3 |

EXAMPLE 1

An isocyanate-capped polyether-urethane prepolymer (4.10% NCO) was prepared by reacting, for 3 hr. at 80° C., 1.61 moles of 2,4-tolylenediisocyanate and 1.00

EXAMPLE 3

An isocyanate-capped polyester-urethane prepolymer (4.31% NCO) was prepared by reacting, for 3 hr. at 80° C., 1.80 moles of 2,4-tolylenediisocyanate and 1.00 mole of mixed-polyester diol of molecular weight 1250 (from 0.840 moles of ethanediol and 0.312 moles of 1,4-butanediol per mole of adipic acid).

A mixture of 50 g. of the above polyester-urethane prepolymer and 4.0 g. of methyl 2,4-diaminobenzoate was stirred at 100° C. for about 9 min. with degassing, poured into a slab mold, then cured for 16 hr. at 100° C.

Properties of the resulting elastomeric copolymer were as follows:

| | |
|---|---|
| $M_{100}$ (psi) | 220 |
| $M_{300}$ (psi) | 330 |
| $T_B$ (psi) | 3300 |
| $E_B$ (%) | 670 |
| Shore A hardness | 54 |
| Fast-tear strength (pli) | 90 |

EXAMPLE 4

A mixture of 50 g. of the polyether-urethane prepolymer of Example 2 and 7.6 g. of n-butyl 2,4-diaminobenzoate was stirred at 100° C. for about 7.5 min. with degassing, poured into a slab mold, then cured for 8 hr. at 100° C.

Properties of the resulting elastomeric copolymer were as follows:

| | |
|---|---|
| $M_{100}$ (psi) | 300 |
| $M_{300}$ (psi) | 950 |
| $T_B$ (psi) | 4000 |
| $E_B$ (%) | 400 |
| Shore A hardness | 62 |
| Fast-tear strength (pli) | 85 |

EXAMPLE 5

A mixture of 50 g. of the polyether-urethane prepolymer of Example 2 and 6.4 g. of molten N-ethyl-2,4-diaminobenzamide was stirred at 100° C. for about 1 min. with degassing, poured into a slab mold, then cured for 3 hr. at 100° C.

Properties of the resulting elastomeric copolymer were as follows:

| | |
|---|---|
| $M_{100}$ (psi) | 600 |
| $M_{300}$ (psi) | 3100 |
| $T_B$ (psi) | 6300 |
| $E_B$ (%) | 360 |
| Shore A hardness | 80 |
| Fast-tear strength (pli) | 160 |

EXAMPLE 6

A mixture of 50 g. of the polyether-urethane prepolymer of Example 2 and 8.6 g. of molten mixed 2,4-diaminobenztoluidides (from mixed toluidines) was stirred at 100° C. for about 5 min. with degassing, poured into a slab mold, then cured for 12 hr. at 100° C.

Properties of the resulting elastomeric copolymer were as follows:

| | |
|---|---|
| $M_{100}$ (psi) | 1700 |
| $M_{300}$ (psi) | 6000 |
| $T_B$ (psi) | 7000 |
| $E_B$ (%) | 330 |
| Shore A hardness | 94 |
| Fast-tear strength (pli) | 65 |

EXAMPLE 7

A mixture of 50 g. of the polyether-urethane prepolymer of Example 2 and 7.6 g. of molten 2,4-diaminobenzmorpholide was stirred at 100° C. for about 1.7 min. with degassing, poured into a slab mold, then cured for 12 hr. at 100° C.

Properties of the resulting elastomeric copolymer were as follows:

| | |
|---|---|
| $M_{100}$ (psi) | 1100 |
| $M_{300}$ (psi) | 4950 |
| $T_B$ (psi) | 7900 |
| $E_B$ (%) | 350 |
| Shore A hardness | 88 |
| Fast-tear strength (pli) | 220 |

EXAMPLE 8

A mixture of 50 g. of the polyether-urethane prepolymer of Example 2 and 8.0 g. of crystalline 4-hydroxybutyl 2,4-diaminobenzoate was stirred at 100° C. for about 3 min. with degassing, poured into a slab mold, then cured for 12 hr. at 100° C.

Properties of the resulting elastomeric copolymer were as follows:

| | |
|---|---|
| $M_{100}$ (psi) | 200 |
| $M_{300}$ (psi) | 550 |
| $T_B$ (psi) | 1550 |
| $E_B$ (%) | 400 |
| Shore A hardness | 55 |
| Fast-tear strength (pli) | 50 |

EXAMPLE 9

A mixture of 50 g. of the polyether-urethane prepolymer of Example 2, 6.3 g. of n-butyl 2,4-diaminobenzoate, and 1.2 g. of 4-hydroxybutyl 2,4-diaminobenzoate was stirred at 100° C. for about 3 min. with degassing, poured into a slab mold, then cured for 12 hr. at 100° C.

Properties of the resulting elastomeric copolymer were as follows:

| | |
|---|---|
| $M_{100}$ (psi) | 300 |
| $M_{300}$ (psi) | 800 |
| $T_B$ (psi) | 4500 |
| $E_B$ (%) | 420 |
| Shore A hardness | 62 |
| Fast-tear strength (pli) | 80 |

Examples 1 and 2 illustrate that using the same curing agent hardness of the polyurethane is related directly to isocyanate content.

Example 3 illustrates that for the same curing agent polyester based polyurethane polymers have higher tear strength and are much softer than polyether based polymers.

Examples 4, 8, and 9 illustrate that when compared to Example 2 the use of higher alkyl ester derivatives or mixtures gives softer vulcanizates without sacrificing tear strength.

Examples 5 and 7 illustrate that alkyl amide derivatives give harder products than ester derivatives.

Example 6 illustrates that aryl amides give the hardest vulcanizates.

What is claimed is:

1. In a process of preparing a polyurethane/polyurea composition by curing a prepolymer comprising the reaction product of a glycol having a molecular weight of about 500–5000 and an organic diisocyanate the improvement which consists essentially of curing said prepolymer with a curing agent having the general formula:

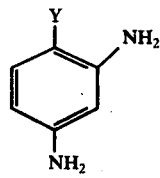

in which Y is either

and wherein $R_2$ and $R_3$ are each selected from the group consisting of H, $C_1$-$C_8$ alkyl which may contain OH or ether groups, and $C_6$-$C_{12}$ aryl, and wherein $R_2$ and $R_3$ may form a 5- or 6-membered ring which may contain one oxygen atom, one nitrogen atom, or one oxygen atom and one nitrogen atom.

2. The composition of claim 1 wherein said organic diisocyanate is selected from the group consisting of $C_8$-$C_{25}$ aromatic, $C_2$-$C_{18}$ aliphatic, and $C_5$-$C_{25}$ cycloaliphatic diisocyanates.

3. The composition of claim 1 wherein the 5- or 6-membered ring is a hetero ring containing oxygen or nitrogen.

4. The composition of claim 1 wherein said diisocyanate is 2,4-tolylene diisocyanate.

5. A polyurethane elastomer which contains structural units of the formula.

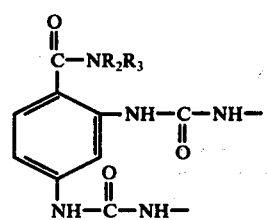

wherein $R_2$ and $R_3$ are each selected from the group consisting of H, $C_1$-$C_8$ alkyl which may contain OH or ether groups, and $C_6$-$C_{12}$ aryl, and wherein $R_2$ and $R_3$ may form a 5- or 6-membered ring which may contain one oxygen atom, one nitrogen atom, or one oxygen atom and one nitrogen atom.

6. A polyurethane/polyurea composition obtained by the process of claim 1.

* * * * *